US011438509B2

(12) United States Patent
Matsushima et al.

(10) Patent No.: US 11,438,509 B2
(45) Date of Patent: Sep. 6, 2022

(54) IMAGING APPARATUS CONFIGURED TO RECORD ORIENTATION OF THE IMAGING APPARATUS WHEN AN IMAGE IS CAPTURED

(71) Applicant: CANON KABUSHIKI KAISHA, Tokyo (JP)

(72) Inventors: Shuichiro Matsushima, Tokyo (JP); Naomi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 16/830,115

(22) Filed: Mar. 25, 2020

(65) Prior Publication Data
US 2020/0314337 A1     Oct. 1, 2020

(30) Foreign Application Priority Data

Mar. 29, 2019  (JP) .............................. JP2019-068848
Mar. 29, 2019  (JP) .............................. JP2019-068849

(51) Int. Cl.
*H04N 5/232* (2006.01)
*G06T 7/70* (2017.01)

(52) U.S. Cl.
CPC ........... *H04N 5/23245* (2013.01); *G06T 7/70* (2017.01); *H04N 5/23216* (2013.01)

(58) Field of Classification Search
CPC ........... H04N 5/23245; H04N 5/23216; H04N 1/2125; G06F 16/7867; G06T 7/70
See application file for complete search history.

(56) References Cited

U.S. PATENT DOCUMENTS

| | | | |
|---|---|---|---|
| 6,148,149 A * | 11/2000 | Kagle ................ | H04N 5/23218 396/50 |
| 6,262,769 B1 * | 7/2001 | Anderson ............ | H04N 1/0044 348/333.1 |
| 6,597,817 B1 * | 7/2003 | Silverbrook ......... | B41J 2/17513 348/208.13 |
| 8,013,894 B2 * | 9/2011 | Niwa ................. | H04N 5/23293 348/208.16 |
| 8,390,717 B2 * | 3/2013 | Yoshikawa ........ | H04N 5/23287 348/333.01 |
| 8,451,296 B2 * | 5/2013 | Ono .................... | H04N 5/23293 345/649 |

(Continued)

FOREIGN PATENT DOCUMENTS

| | | | | |
|---|---|---|---|---|
| JP | 2004145291 A | * | 5/2004 | ........ H04N 5/23293 |
| JP | 2010050566 A | * | 3/2010 | |

(Continued)

*Primary Examiner* — John Villecco
(74) *Attorney, Agent, or Firm* — Canon U.S.A., Inc. IP Division

(57) ABSTRACT

An imaging apparatus includes an imaging unit, a detection unit that detects orientation of the imaging apparatus, a control unit that implements control such that a still image or a moving image captured by the imaging unit is recorded in a recording medium, a first setting unit that sets whether orientation information based on the orientation detected by the detection unit is recorded together with the still image captured by the imaging unit, and a second setting unit that sets whether the orientation information based on the orientation detected by the detection unit is recorded together with the moving image captured by the imaging unit.

19 Claims, 7 Drawing Sheets

(56) References Cited

U.S. PATENT DOCUMENTS

| | | | |
|---|---|---|---|
| 8,648,931 B2* | 2/2014 | Chuang | H04N 1/00384 348/231.3 |
| 9,083,939 B2* | 7/2015 | Sanno | H04N 5/772 |
| 9,830,683 B2* | 11/2017 | Mikawa | G06T 3/60 |
| 10,552,946 B2* | 2/2020 | Furukawa | G06F 1/1694 |
| 2004/0141085 A1* | 7/2004 | Nickel | H04N 1/32128 348/333.11 |
| 2004/0185878 A1* | 9/2004 | Woo | H04N 21/41407 455/457 |
| 2005/0286888 A1* | 12/2005 | Konttinen | G03B 17/20 396/374 |
| 2006/0033819 A1* | 2/2006 | Ozaki | H04N 5/2628 348/208.99 |
| 2009/0027510 A1* | 1/2009 | Yumiki | H04N 5/23287 348/222.1 |
| 2009/0251564 A1* | 10/2009 | Ito | H04N 1/00456 348/231.2 |
| 2010/0060792 A1* | 3/2010 | Corlett | H04N 19/85 348/583 |
| 2011/0128410 A1* | 6/2011 | Lee | H04N 5/772 348/231.99 |
| 2013/0167089 A1* | 6/2013 | Abe | G06F 3/04886 715/835 |
| 2015/0036998 A1* | 2/2015 | Ishimaru | H04N 9/8205 386/228 |
| 2015/0189169 A1* | 7/2015 | Ikeda | H04N 5/2621 348/218.1 |
| 2015/0356081 A1* | 12/2015 | Cronin | G06F 16/583 348/231.3 |

FOREIGN PATENT DOCUMENTS

| | | | |
|---|---|---|---|
| JP | 2010193066 A | * | 9/2010 |
| JP | 2014-123888 A | | 7/2014 |

* cited by examiner

IMAGING APPARATUS CONFIGURED TO RECORD ORIENTATION OF THE IMAGING APPARATUS WHEN AN IMAGE IS CAPTURED

BACKGROUND

Field

The present disclosure relates to an imaging apparatus that can set whether orientation information of the imaging apparatus when an image is captured is recorded, and a control method.

Description of the Related Art

In general, a moving image is conventionally captured at a landscape angle of view and played back. In recent years, mobile terminals that have portrait screens such as smart phones are widely used, and there are increasing cases in which moving images are captured at a portrait angle of view and played back. When a moving image is captured with a conventional camera that has a landscape angle of view on assumption that the moving image is played back in a mobile terminal that has a portrait screen, the moving image may be captured with the camera held in a vertical position. At this time, unless orientation information that represents the moving image is captured in the vertical position is added to a moving image file, the moving image cannot be displayed with a high resolution on the entire screen when played back in the mobile terminal, or the vertical direction of the screen does not coincide with the vertical direction of the moving image, and the moving image at the portrait angle of view is displayed in the horizontal orientation. When a captured still image is recorded in a still image file, the orientation information of the camera during capturing is typically added to the still image file. In Japanese Patent Laid-Open No. 2014-123888, a method of adding the orientation information of a camera to a moving image file is disclosed. However, a relationship between a method of adding the orientation information of a camera to a moving image and a method of adding the orientation information to a still image is not disclosed therein.

SUMMARY

There is an issue in that unintentional orientation information is added in some cases where a setting that represents whether orientation information of a camera that is detected by the camera is added to an image for recording is shared for a still image and a moving image.

The present disclosure provides an imaging apparatus that can set recording of orientation information suitable for the purpose or environment of playback of a still image and a moving image.

According to an aspect of the present disclosure, there is provided an imaging apparatus including an imaging unit, a detection unit that detects orientation of the imaging apparatus, a control unit that implements control such that a still image or a moving image captured by the imaging unit is recorded in a recording medium, a first setting unit that sets whether orientation information based on the orientation detected by the detection unit is recorded together with the still image captured by the imaging unit, and a second setting unit that sets whether the orientation information based on the orientation detected by the detection unit is recorded together with the moving image captured by the imaging unit.

Further features of the present disclosure will become apparent from the following description of exemplary embodiments with reference to the attached drawings.

DESCRIPTION OF THE EMBODIMENTS

A preferred embodiment of the present disclosure will hereinafter be described with reference to the drawings.

Figure 1:
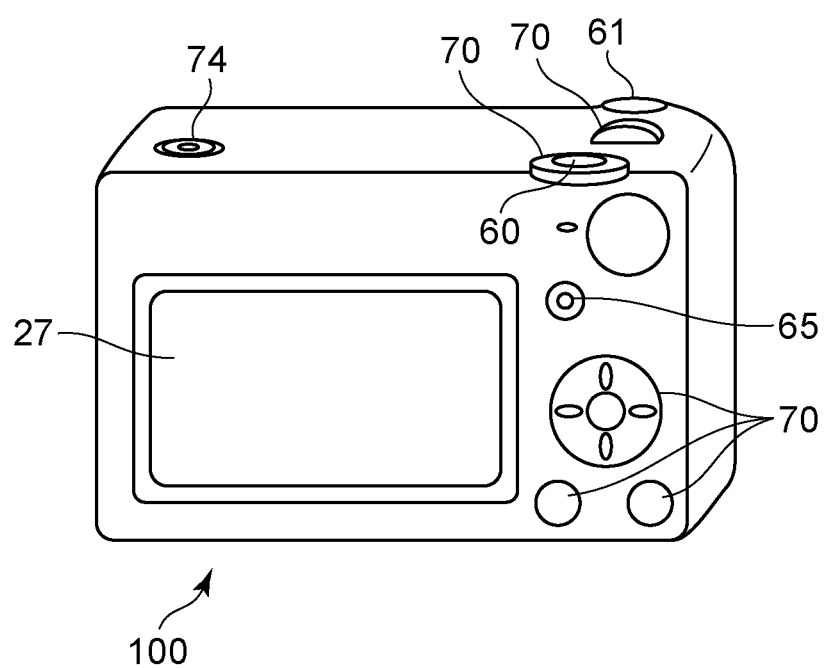
FIG. 1 illustrates a camera as an example of an imaging apparatus according to the present disclosure.

FIG. 1 illustrates a camera 100 as an example of an imaging apparatus according to the present disclosure. A liquid crystal display 27 is a display unit that displays an image and various kinds of information. A shutter button 61 is an operation unit for an instruction for capturing a still image. A moving image recording button 65 is an operation unit for an instruction for starting and ending capturing of a moving image. A mode-changing switch 60 is an operation unit for switching among various modes. The mode-changing switch 60 sets operation of switching between a still image mode and a moving image mode. Operation units 70 include operation members such as various switches for receiving various operations from a user, a button, a dial. A power switch 74 is a push button for turning power on or off. A recording medium 200 is, for example, a memory card or a hard disk. The recording medium 200 can communicate with the camera 100 and enables recording and playback.

Figure 2:
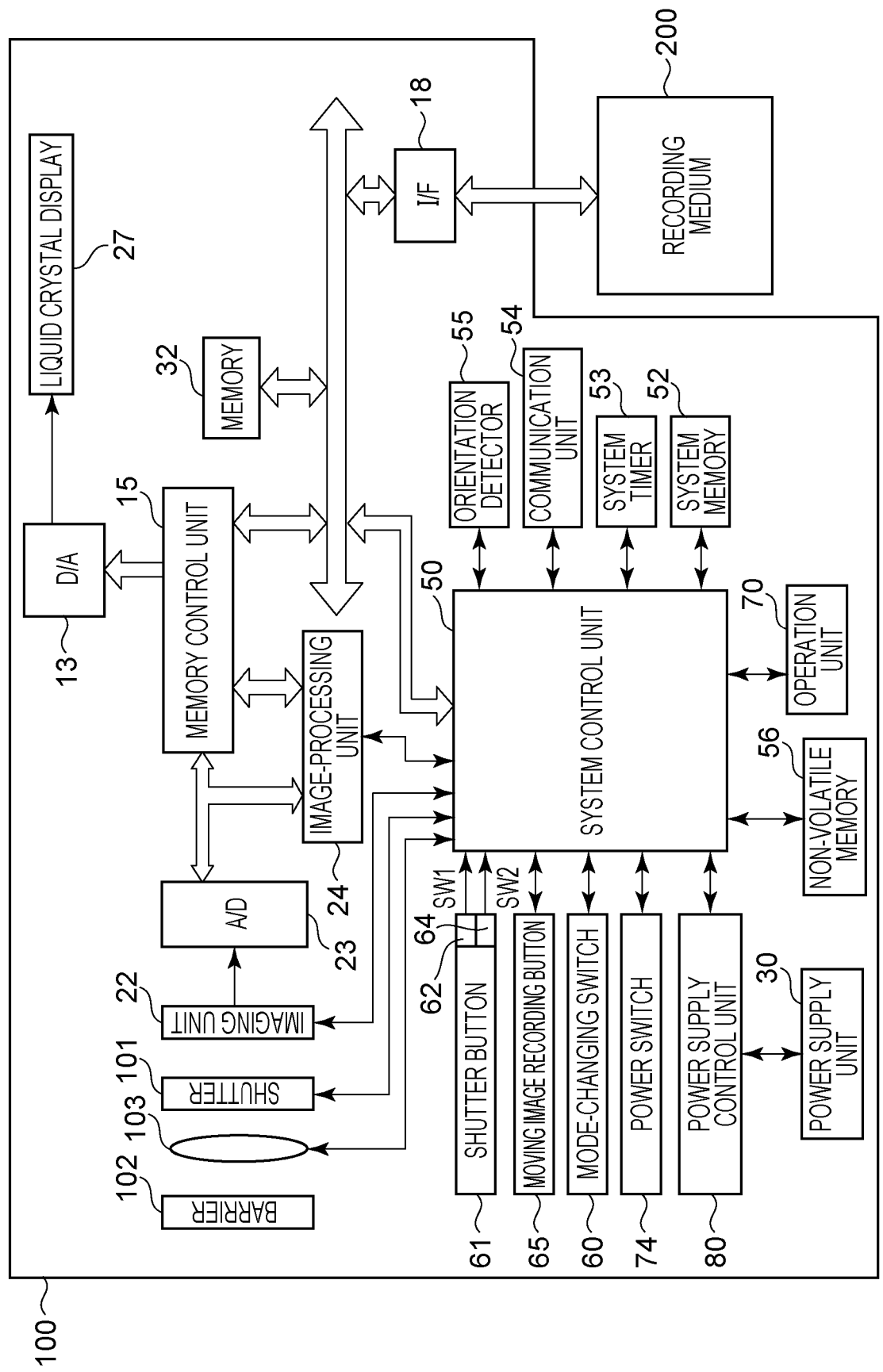
FIG. 2 is a block diagram of an example of the structure of a camera 100.

FIG. 2 is a block diagram of an example of the structure of the camera 100 according to the present embodiment.

In FIG. 2, an image capturing lens 103 is a lens group including a zoom lens and a focus lens. A shutter 101 has a function of a stop. An imaging unit 22 is an imaging element that includes, for example, a CCD or CMOS element that converts an optical image into an electrical signal. An A/D converter 23 converts an analog signal into a digital signal. The A/D converter 23 is used to convert an analog signal that is outputted from the imaging unit 22 into a digital signal. A barrier 102 covers an imaging system of the camera 100 including the image capturing lens 103 to prevent stain and damage of the imaging system including the image capturing lens 103, the shutter 101, and the imaging unit 22.

An image-processing unit 24 performs a resizing process or a color conversion process such as predetermined pixel interpolation or reduction for data from the A/D converter 23 or data from a memory control unit 15. The image-processing unit 24 performs a predetermined calculation process by using captured image data. A system control unit 50 controls exposure and distance measurement on the basis of an obtained calculation result. Consequently, an AF (autofocus) process in a TTL (through-the-lens) method, an AE (auto-exposure) process, and an EF (pre-flashing) process are performed. The image-processing unit 24 also performs a predetermined calculation process by using the captured image data and an AWB (automatic white balance) process of the TTL method on the basis of an obtained calculation result.

The data that is outputted from the A/D converter 23 is directly written to a memory 32 via both of the image-processing unit 24 and the memory control unit 15 or the memory control unit 15. The memory 32 stores image data that is obtained by the imaging unit 22 and that is converted into digital data by the A/D converter 23 and image data that is to be displayed on the liquid crystal display 27. The memory 32 has a sufficient storage capacity for recording a predetermined number of still images, a moving image having a predetermined time, and a voice.

The memory 32 doubles as a memory (video memory) for image display. A D/A converter 13 converts data for image display that is stored in the memory 32 into an analog signal and transmits the signal to the liquid crystal display 27. The image data for display that is thus written in the memory 32 is displayed on the liquid crystal display 27 via the D/A converter 13. The liquid crystal display 27 displays a screen in response to the analog signal from the D/A converter 13 on a display such as a LCD. The digital signal that is converted from an analog signal by the A/D converter 23 once and that is stored in the memory 32 is converted into an analog signal by the D/A converter 13 and is successively transmitted and displayed on the liquid crystal display 27 for live view display.

Figure 4:
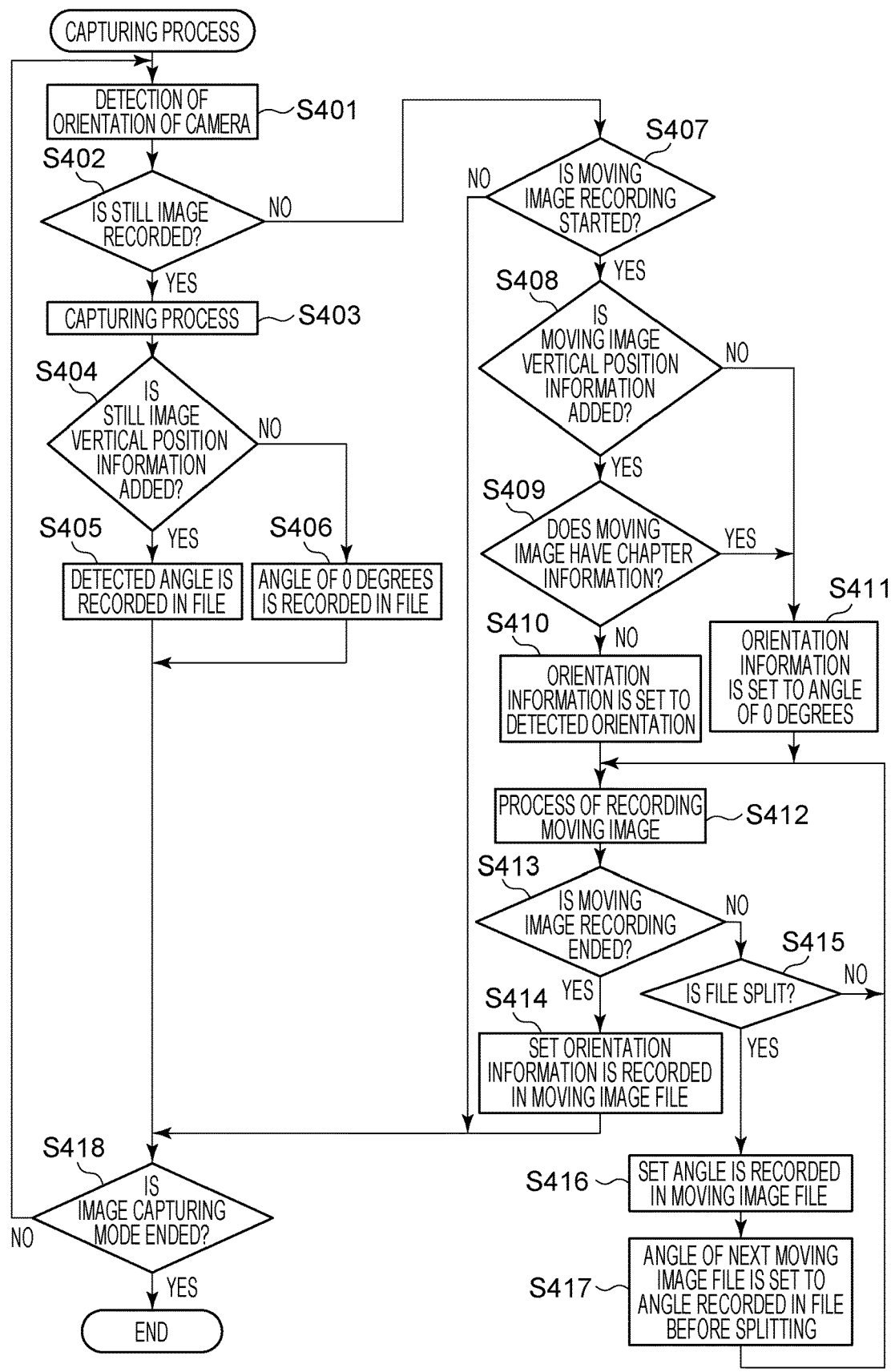
FIG. 4 is a flowchart illustrating processes in a capturing mode.
Figure 7:
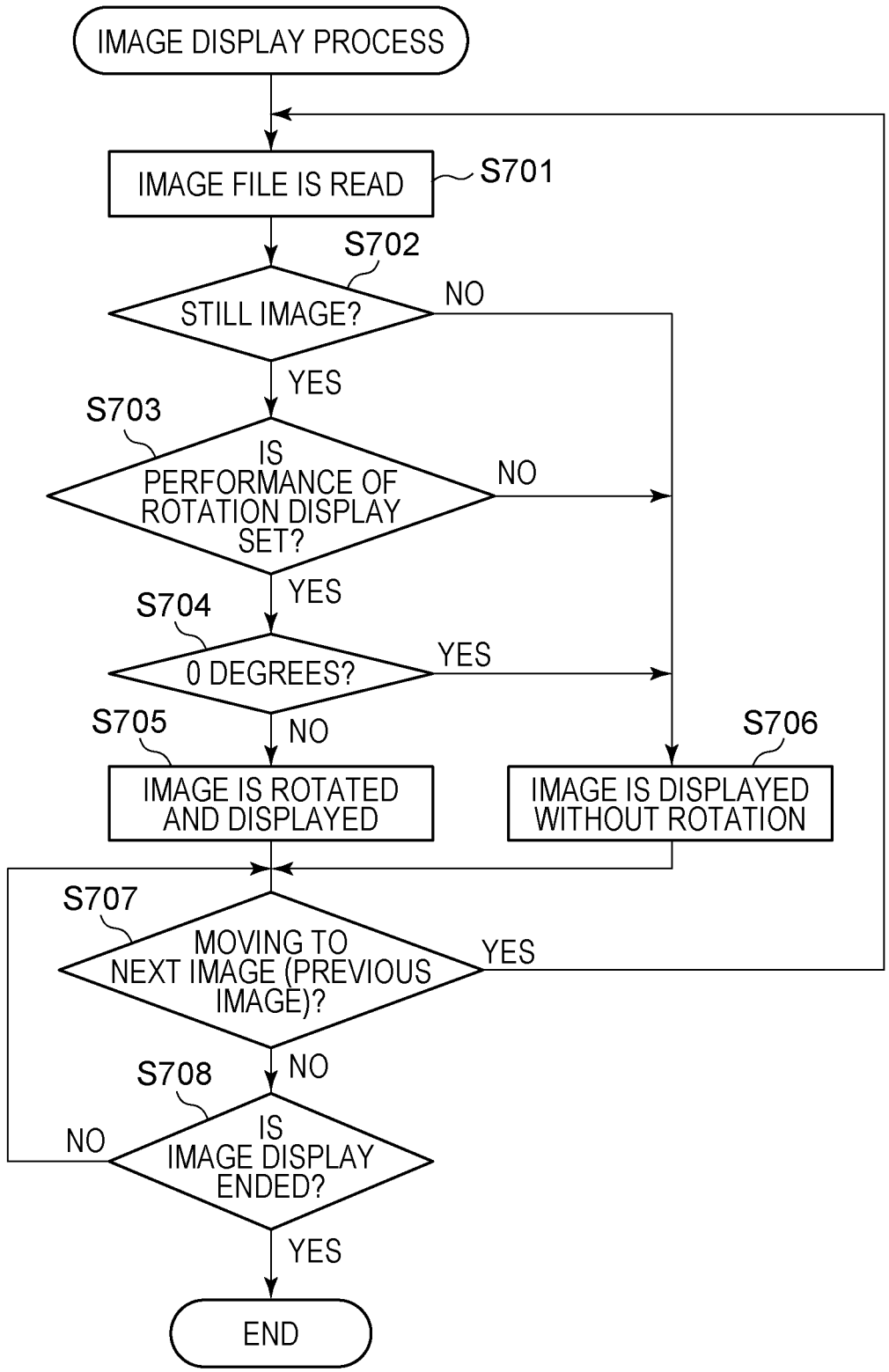
FIG. 7 is a flowchart illustrating an image display process of an image in a playback mode.

A non-volatile memory 56 is an electrically erasable and recordable recording medium, an example of which is an EEPROM. Constants and programs for operation of the system control unit 50, for example, are stored in the non-volatile memory 56. The programs described herein include computer programs for flowcharts described later according to the present embodiment. Processes in flowcharts in FIG. 4 and FIG. 7 are performed by reading and performing the programs that are recorded in the non-volatile memory 56 by the system control unit 50.

The system control unit 50 controls the entire camera 100 and includes one or more processors. The system control unit 50 reads the programs that are recorded in the non-volatile memory 56 and runs the read programs to control blocks and to perform processes according to the present embodiment described later. A RAM is used as a system memory 52. Constants and variables for operation of the system control unit 50 and the programs that are read from the non-volatile memory 56, for example, are loaded on the system memory 52. The system control unit 50 also controls, for example, the memory 32 and the D/A converter 13 for display control.

A system timer 53 is a time measurement unit that measures time for various kinds of control or time of a timepiece that is contained therein.

The mode-changing switch 60, the shutter button 61, the moving image recording button 65, and the operation units 70 are operation units for inputting various operation instructions into the system control unit 50.

The mode-changing switch 60 switches the operation mode of the system control unit 50 to a still image recording mode, a moving image capturing mode, or another mode. Examples of the still image recording mode include an automatic capturing mode, an automatic scene determination mode, a manual mode, various scene modes corresponding to capturing settings for capturing scenes, a program AE mode, and a custom mode. Examples of the moving image capturing mode include an automatic capturing mode, a manual mode, a program AE mode, and a custom mode. A first shutter switch 62 is switched on during operation of the shutter button 61 that is included in the camera 100 at a so-called half push (capturing preparation instruction) and generates a first shutter switch signal SW1. In response to the first shutter switch signal SW1, operation such as the AF (autofocus) process, the AE (auto-exposure) process, the AWB (automatic white balance) process, or the EF (pre-flashing) process starts.

A second shutter switch 64 is switched on at the end of operation of the shutter button 61 at a so-called full push (capturing instruction) and generates a second shutter switch signal SW2. In response to the second shutter switch signal SW2, the system control unit 50 starts a series of capturing processes ranging from reading a signal from the imaging unit 22 to writing image data in the recording medium 200.

The operation members of the operation units 70 have appropriate functions for the scenes that are assigned by selecting various function icons that are displayed on, for example, the liquid crystal display 27 and function as various function buttons. Examples of the function buttons include a 4-way button in up, down, left, and right directions, a SET button, a controller wheel, a menu button, an electronic dial, an end button, a back button, a next image button, a jump button, a depth-of-field preview button, and an attribute change button. For example, when the menu button is pushed, a menu screen on which various settings can be made is displayed on, for example, the liquid crystal display 27. The user can intuitively make various settings by using the menu screen that is displayed on, for example, the liquid crystal display 27, the 4-way button in up, down, left, and right directions and the SET button.

A power supply control unit 80 includes, for example, a battery-detecting circuit, a DC-DC converter, a switch circuit that switches a block to be energized and detects the presence or absence of a battery that is installed, the kind of the battery, and remaining battery charge. The power supply control unit 80 controls the DC-DC converter on the basis of a result of detection and an instruction from the system control unit 50 and supplies a required voltage to components that include the recording medium 200 during a required period.

A power supply unit 30 includes, for example, a primary battery such as an alkali battery or a lithium battery, or a secondary battery such as a NiCd battery, a NiMH battery, or a Li battery, and an AC adapter. A recording medium I/F 18 is an interface with the recording medium 200 such as a memory card or a hard disk. The recording medium 200 is, for example, a memory card for recording a captured image and includes, for example, a semiconductor memory, an optical disk, or a magnetic disk.

A communication unit 54 is connected wirelessly or with a wired cable and transmits and receives, for example, an image signal or a voice signal. The communication unit 54 can also be connected to a wireless LAN (Local Area Network) or the internet. The communication unit 54 can transmit an image (including a live view) that is imaged by the imaging unit 22 and an image that is recorded in the recording medium 200 and can receive image data and other various kinds of information from an external device.

An orientation detector 55 detects that the orientation of the camera 100 in the gravity direction is 0 degrees, 90 degrees, 180 degrees, or 270 degrees and reports the detected orientation to the system control unit 50. The system control unit 50 can determine whether an image is imaged by the imaging unit 22 with the camera 100 held horizontally or vertically on the basis of the orientation that is detected by the orientation detector 55. The system control unit 50 can add orientation information (orientation information) depending on the orientation that is detected by the orientation detector 55 to an image file for the image that is imaged by the imaging unit 22, can rotate and record the image, and can cause the liquid crystal display 27 to display the orientation information depending on the detected orientation. Examples of the orientation detector 55 include an accelerometer and a gyro-sensor.

In the case where a still image capturing mode is set by the mode-changing switch 60 in the camera 100, the system control unit 50 performs still image capturing operation. In the still image capturing mode, the first shutter switch signal SW1 is generated in response to half push operation of the shutter button 61, and the system control unit 50 performs a capturing preparation process (such as the AF process, the AE process, the AWB process, or the EF process). The second shutter switch signal SW2 is generated in response to full push operation of the shutter button 61, and the system control unit 50 performs a still image capturing process. In the still image capturing process, the A/D converter 23 converts a signal that the imaging unit 22 obtains by imaging into digital data (image data), and the image-processing unit 24 performs still image processing and writes image data in the memory 32. The system control unit 50 generates an image file such as a JPEG file from the image data that is written in the memory and records the image file in the recording medium 200 via the recording medium I/F 18. Continuous full push operation of the shutter button 61 results in a continuous capturing mode in which the still image capturing process is repeated to continuously capture and record images (serial images) until the full push of the shutter button 61 is released.

In the case where a moving image capturing mode is set, the system control unit 50 starts a moving image capturing process when the moving image recording button 65 is operated to input an instruction for starting capturing of a moving image. The moving image capturing process continues until the moving image recording button 65 is operated again to input an instruction for ending capturing of the moving image. Another button other than the moving image recording button 65 may be used to input the instruction for starting capturing of the moving image and the instruction for ending capturing of the moving image. In the moving image capturing process, imaging is repeated at a frame rate that is set by the imaging unit 22, and the A/D converter 23 converts a signal that is obtained by imaging into digital data to obtain serial images, that is, moving image data. The image-processing unit 24 performs moving image processing on the obtained moving image data and writes the image data in the memory 32. The system control unit 50 generates a moving image file such as a MPEG file from pieces of serial image data (moving image data) that is written in the memory and records the moving image file in the recording medium 200 via the recording medium I/F 18 for recording control. In a process of recording the moving image file, the end of capturing of the moving image and the completion of the moving image file are not waited, the moving image file is created, and moving image data the process of which ends is sequentially recorded. Information required for the moving image file is recorded after recording of the moving image data ends. This is the end of the process of recording the moving image file.

The camera 100 according to the present embodiment includes the moving image recording button 65 in addition to the shutter button 61. Accordingly, the moving image can be captured by operating the moving image recording button 65 even with the still image capturing mode set. However, the still image cannot be captured with the moving image capturing mode set, and the still image is not captured even when the shutter button 61 is pushed. The moving image may be captured in response to a push of the shutter button 61.

Figure 3:
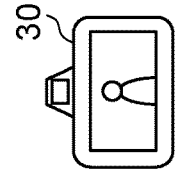
FIG. 3 illustrates vertical position information and states of image display in devices.

Regardless of the setting of the capturing mode, the still image capturing process may be performed by operating the shutter button 61, and the moving image capturing process may be performed by operating the moving image recording button 65. The following description with reference to FIG. 3 includes states of display of an image in devices in the case where orientation information (horizontal position information and vertical position information) of the camera 100 that is detected by the orientation detector 55 is added to the image and recorded, and in the case where the orientation information is not added or recorded. FIG. 3 illustrates the states of display of the image in the camera 100 having a landscape display screen during capturing, in a mobile terminal having a portrait display screen during playback, and on a screen of a personal computer having a landscape display screen during playback. An image display process in the camera 100 according to the present embodiment during playback will be described later with reference to FIG. 7. The camera 100 records a captured landscape image regardless of a setting of the possibility of addition of the vertical position information. In the case where the setting represents that the vertical position information can be added, the horizontal position information is added to the landscape image if the camera is not rotated for capturing, the vertical position information is added thereto if the camera 100 is rotated 90 degrees or 270 degrees for capturing. In the case where the setting represents that the vertical position information is not added, the horizontal position information is added thereto regardless of the orientation of the camera 100.

In the following description, an image is captured with the camera 100 held in the horizontal position, that is, with a rotation angle being 0 degrees without rotation of the camera 100 (301) in a setting that represents the vertical position information is not added to the image, and the image is played back in a mobile terminal and on a screen of a PC. In this case, the horizontal position information is recorded in the image. When the image is played back with the mobile terminal vertically held, the image is displayed in a positive direction (302). However, a landscape image is displayed such that the entire image is within a portrait screen. Accordingly, blank areas that are provided up and down decrease an area in which the image is displayed, and the resolution of display of the image decreases. When the image is played back with the mobile terminal horizontally held, the image is rotated 90 degrees and displayed (303) because the vertical state of the display screen is changed from the above state (302). In this state, the vertical direction of the image coincides with the vertical direction of the mobile terminal, and the display screen is landscape. Accordingly, the display screen is filled up with the displayed image at a high resolution (303). The screen of a personal computer is typically fixed in the horizontal direction. Accordingly, as in the case where the mobile terminal is horizontally held, the area in which the image is displayed occupies the entire screen of the personal computer and increases, and the image is displayed at a high resolution (304).

In the following description, an image is captured with the camera 100 held in the vertical position, that is, with the camera 100 rotated 90 degrees or 270 degrees (305) in the setting that represents the vertical position information is not added to the image, and the image is played back. The horizontal position information is recorded in the image. In this state, the orientation information in the image does not match the vertical state of the image. When the image is played back with the mobile terminal vertically held, the image is displayed in the same state as the state (302) in which the vertical state of the image does not coincide with the vertical state of the mobile terminal (306), because the vertical position information is not added, but the horizontal position information is added. Also, when the image is played back with the mobile terminal horizontally held, the image is displayed in the same state as the state (303) in which the vertical state of the image does not coincide with the vertical state of the mobile terminal (307), because the vertical position information is not added, but the horizontal position information is added. Also, when the image is played back on the screen of the personal computer, the image is displayed in same state as the state (304) in which the vertical state of the image does not coincide with the vertical state of the screen of the personal computer (308), because the vertical position information is not added, but the horizontal position information is added. In the case where an image is captured with the camera held in the vertical position in the setting that represents the vertical position information is not added, the vertical position information is not added to the image, but the horizontal position information is added. Accordingly, playback devices such as the mobile terminal and the screen of the personal computer cannot distinguish between capturing in the vertical position and capturing in the horizontal position, and the image is displayed in a state in which the vertical states do not coincide with each other. This makes the image difficult to see or watch.

In the following description, an image is captured with the camera 100 held in the horizontal position, that is, with the rotation angle being 0 degrees without rotation of the camera 100 (309) in a setting that represents the vertical position information can be added, and the image is played back. In this case, the horizontal position information is added to the image. When the image is played back with the mobile terminal vertically held, the image is displayed in the same state as the state (302) in which the vertical state of the image coincides with the vertical state of the mobile terminal (310), because the image is captured without rotation of the camera 100, and the horizontal position information is recorded. When the image is played back with the mobile terminal horizontally held, the image is displayed in the same state as the state (303) in which the vertical state of the image coincides with the vertical state of the mobile terminal (311), because the image is captured without rotation of the camera 100, and the horizontal position information is recorded. Also, when the image is played back on the screen of the personal computer, the image is displayed in the same state as the state (304) in which the vertical state of the image coincides with the vertical state of the mobile terminal (312), because the image is captured without rotation of the camera 100, and the horizontal position information is recorded.

In the following description, an image is captured with the camera 100 held in the vertical position, that is, with the camera 100 rotated 90 degrees or 270 degrees (313) in the setting that represents the vertical position information can be added, and the image to which the vertical position information is added is played back. In this case, the vertical position information is added to the image. Since the image with the vertical position information added is recorded, when the image is played back with the mobile terminal vertically held, the image is rotated in accordance with the vertical position information and displayed (314) for a need that the vertical direction of the image coincides with the vertical direction of the mobile terminal. Rotation of the image brings about a state where not only the vertical direction of the image coincides with the vertical direction of the mobile terminal, but also the display screen and the rotated image are portrait, and the display screen is filled up with the image displayed at a high resolution. When the image is played back with the mobile terminal horizontally held, the image is displayed with the vertical direction of the image coinciding with the vertical direction of the mobile terminal (315). In this case, the direction of long sides of the display screen differs from that of the image, and the image is displayed at a low resolution. The image is rotated in accordance with the vertical position information and displayed on the screen of the personal computer (316). The vertical direction of the image coincides with the vertical direction of the screen of the personal computer. However, the direction of long sides of the image differs from that of the screen of the personal computer, and the image is displayed at a low resolution.

A display method described herein is an example. In some cases, operation differs from the above depending on the specification of image playback software and the specification of hardware of the playback devices. In the case described at (307), if detection of the orientation of the mobile terminal can be invalidated, rotation of the terminal itself enables the image to be seen in the positive direction at a high resolution as in the case at (314). However, the detection of the orientation of the mobile terminal is typically valid, it is complicated to invalidate the detection of the orientation whenever an image is played back.

Still image playback software often rotates and displays an image in accordance with information about the vertical and horizontal directions of the image. However, a moving image player does not support a portrait image, the necessity of addition of the vertical position information to an image differs between environments of a user's playback device. In some cases where captured still images are taken in, for example, a personal computer, and image processing is performed collectively on the images, an image that is not rotated is easy to process. The necessity of the vertical position information differs also depending on the purpose of the use of a capture image. If the vertical position information can be rewritten for every file during image playback, changes in the purpose of the use of the captured image can be dealt with.

The purpose and environments of image playback differ among users as described above, and there is a need for setting the vertical position information separately in a still image file and a moving image file.

Accordingly, the camera 100 according to the present embodiment can set whether the vertical position information (orientation information) that is detected by the camera 100 is added to an image and recorded separately for a still image and a moving image.

Figure 5A:
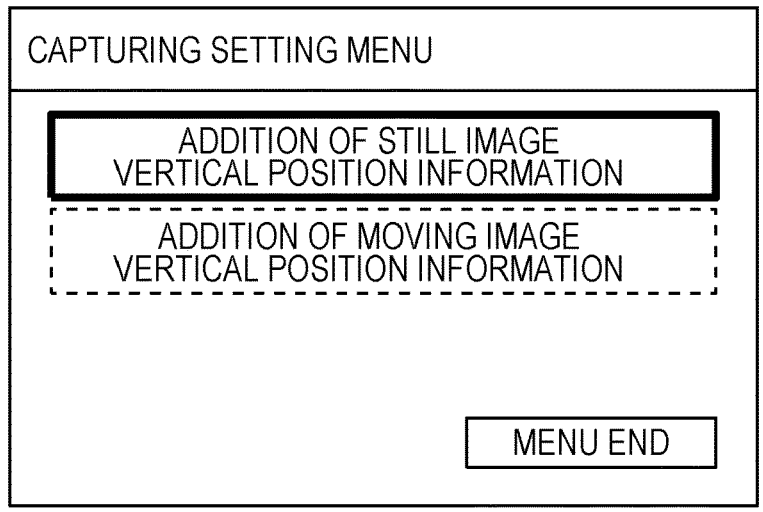
FIG. 5A, 5B, and FIG. 5C illustrate examples of display of a menu screen for a setting of addition of the vertical position information.
Figure 5B:
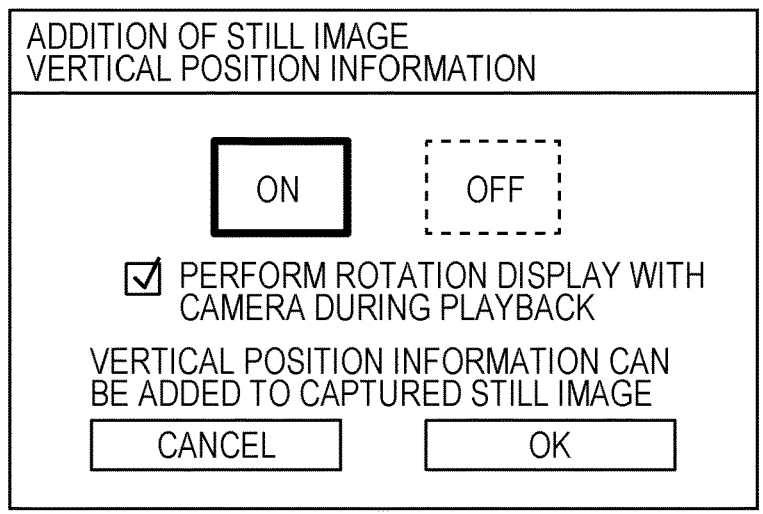
Figure 5C:
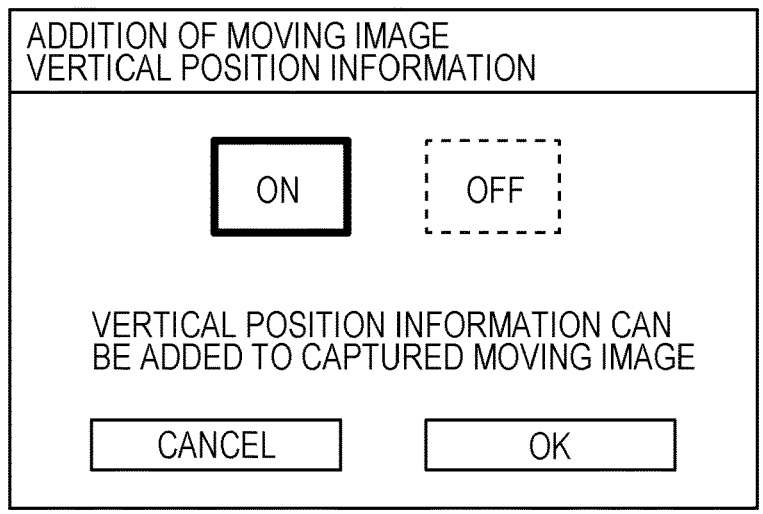

The setting that represents whether the vertical position information (orientation information) is added will be described with reference to FIG. 5A to FIG. 5C. FIG. 5A to FIG. 5C illustrate examples of display of a setting screen.

When the system control unit 50 determines that the user pushes a menu button of the operation units 70, the system control unit 50 causes the liquid crystal display 27 to display a menu top screen in FIG. 5A. As illustrated in FIG. 5A, a setting item for addition of still image vertical position information and a setting item for addition of moving image vertical position information can be selected on the menu top screen. Operation of up and down buttons on the menu top screen enables a selection from the setting items to be changed. Operation of a setting button enables the selection from the setting items to be determined. According to the present embodiment, items irrelevant to a description of a process of adding the vertical position information are omitted, although another camera setting item can be typically set.

When the setting item for addition of the still image vertical position information is selected and determined on the menu top screen, the system control unit 50 causes the liquid crystal display 27 to display the setting screen for addition of the still image vertical position information as illustrated in FIG. 5B. Whether the vertical position information can be added to the still image can be set as a setting of still image orientation information recording on the setting screen for addition of the still image vertical position information. A rotation display setting that represents whether the image to which the vertical position information is added is rotated and displayed during playback in the camera can be set at the same time. The rotation display setting preferably represents that rotation display is allowed only when the setting that represents the vertical position information can be added is made on the setting screen for addition of still image orientation information. The setting of still image orientation information recording and the rotation display setting that are made on the setting screen for addition of the still image vertical position information are stored in the non-volatile memory 56.

When the setting item for addition of the moving image vertical position information is selected and determined on the menu top screen, the system control unit 50 causes the liquid crystal display 27 to display the setting screen for addition of the moving image vertical position information as illustrated in FIG. 5C. Whether the vertical position information can be added or cannot be added to the moving image can be set as a setting of moving image orientation information recording on the setting screen for addition of the moving image vertical position information. The setting of moving image orientation information recording that is made on the setting screen for addition of the moving image vertical position information is stored in the non-volatile memory 56.

When the orientation of the camera 100 during image capturing is the vertical position, the camera 100 according to the present embodiment can thus set whether the orientation information that represents the vertical position is recorded together with the image separately for a still image and a moving image.

In FIG. 5B and FIG. 5C, examples of the setting screen for the setting of still image orientation information recording and the setting of moving image orientation information recording are illustrated. However, this is not a limitation provided that whether the vertical position information can be record as the orientation information can be set separately for a still image and a moving image.

A modification to the setting screen for the setting of still image orientation information recording and a modification to the setting of moving image orientation information recording will be described with reference to FIG. 6A to FIG. 6C.

Figure 6A:
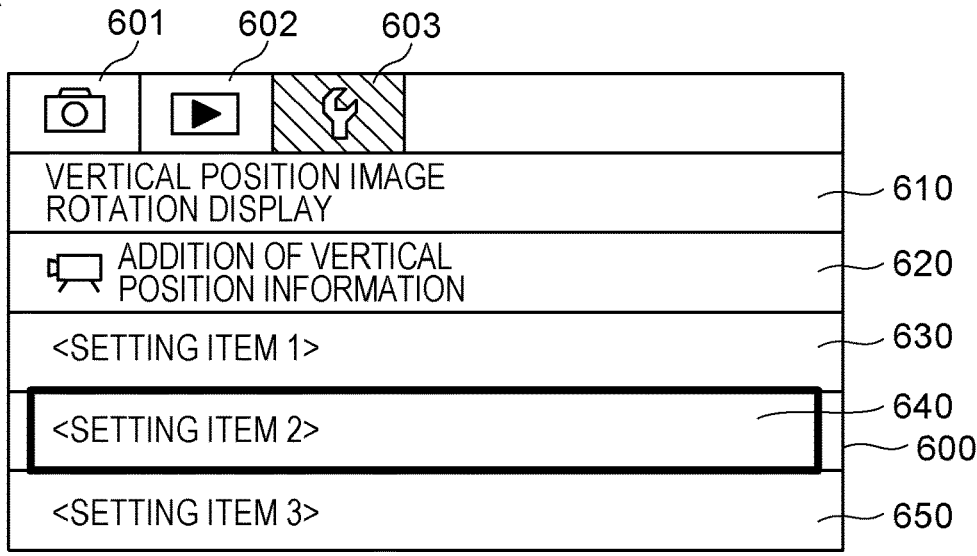
FIG. 6A, 6B, and FIG. 6C illustrates a modification to the display of the menu screen for the setting of addition of the vertical position information.

In FIG. 6A, a menu screen that the system control unit 50 causes the liquid crystal display to display in response to operation of the menu button. The menu screen includes a setting tab 601 related to capturing, a setting tab 602 related to playback, and a tab 603 related to the function of the camera that are displayed thereon. When a cross key of the operation units 70 is operated to select the tabs 601 to 603, setting items related to the respective tabs are displayed. In FIG. 6A, the setting tab 603 related to the function of the camera is selected. Settings related to the function of the camera can include other settings such as a setting item 1 to a setting item 3 (630 to 650) in addition to a setting item 610 for the setting of still image orientation information recording and a setting item 620 for the setting of moving image orientation information recording. A cursor 600 represents the setting item that is currently selected. In FIG. 6A, the setting item 2 (640) is selected. The system control unit 50 moves the cursor 600 for display in response to operation of the up and down buttons. The system control unit 50 causes a screen for a setting of the selected setting item to be displayed in response to operation of the SET button. In the setting item 610 for the setting of still image orientation information recording, a character string of "VERTICAL POSITION IMAGE ROTATION DISPLAY" is displayed. In the setting item 620 for the setting of moving image orientation information recording, a character string of "ADDITION OF VERTICAL POSITION INFORMATION" and an icon that represents a moving image are displayed.

Figure 6B:
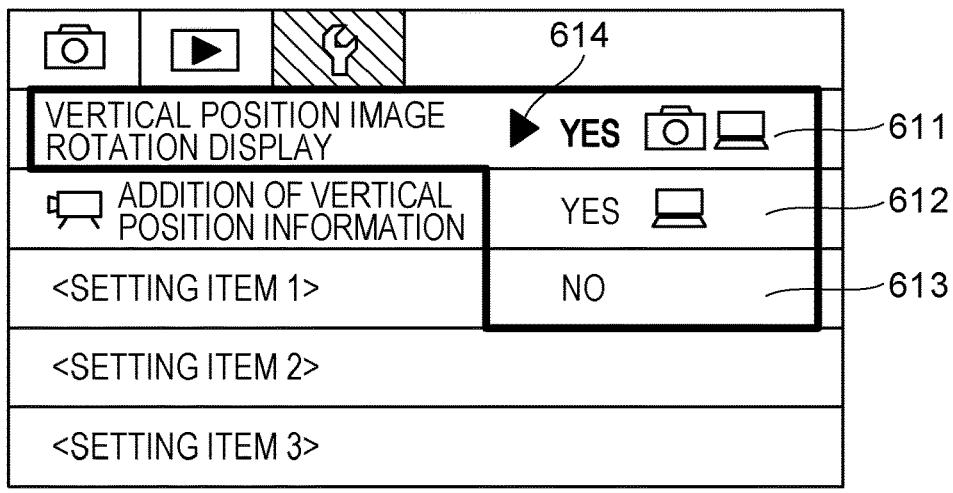

When the setting button is pushed with the setting item 610 for the setting of still image orientation information recording selected, the system control unit 50 causes a setting screen for the still image vertical position information to be displayed as illustrated in FIG. 6B. When the setting button is pushed with the setting item 620 for the setting of moving image orientation information recording selected, the system control unit 50 causes a setting screen for the moving image vertical position information to be displayed as illustrated in FIG. 6C.

As illustrated in FIG. 6B, three choices are displayed as a choice group on the setting screen for the still image vertical position information. Not only the setting of still image orientation information recording that represents whether the orientation information that is detected during capturing is recorded in the still image, but also the rotation display setting that represents whether the image is rotated and displayed on the basis of the orientation information when the image is played back in the camera 100 are set on the setting screen for the still image vertical position information. The setting that represents the orientation information that is detected during capturing is recorded in the still image means a setting that represents the orientation of the camera during capturing is recorded, which corresponds to the setting that represents the vertical position information can be added. The setting that represents the orientation information that is detected during capturing is not recorded means a setting that represents the orientation information that represents the horizontal position is recorded regardless of the orientation of the camera, which corresponds to a setting that represents the vertical position information is not added.

A first choice 611 is a choice for a setting that represents the image is rotated and displayed during playback as the rotation display setting, and for a setting that represents the orientation information that is detected during capturing is recorded as the setting of still image orientation information recording. For the choice 611, a character string of "YES" that represents the rotation display is allowed, an icon that represents a camera, and an icon that represents a PC are displayed. According to the present embodiment, the icon that represents a PC is displayed. However, an icon that represents another device is acceptable provided that the device is a playback device other than a camera. Such display provides a recognition that the rotation display on the basis of the orientation information is allowed in the camera 100 and a recognition that the orientation information is recorded for the rotation display on the basis of the orientation information in another playback device.

A second choice 612 is a choice for a setting that represents the image is displayed without rotation during playback as the rotation display setting, and the setting that represents the orientation information that is detected during capturing is recorded as the setting of still image orientation information recording. For the choice 612, a character string of "YES" and an icon of a PC are displayed as in the choice 611, but an icon of a camera is not displayed. Such display provides a recognition that the rotation display on the basis of the orientation information is not allowed during playback in the camera 100, and a recognition that the rotation display on the basis of the orientation information is allowed in, for example, a PC, that is, it can be recognized that the orientation information that is detected during capturing is recorded together with the image.

A third choice 613 is a choice for the setting that represents the image is displayed without rotation during playback as the rotation display setting, and the setting that represents the orientation information that is detected during capturing is not recorded as the setting of still image orientation information recording. For the choice 613, a character string of "NO" that represents the rotation display on the basis of the orientation information is not allowed during playback is displayed. This provides a recognition that the rotation display on the basis of the orientation information is not allowed during playback in the camera 100, and a recognition that the rotation display on the basis of the orientation information is not allowed also in, for example, a PC, that is, the orientation information during capturing is not record.

Such display of the choice group enables two setting values of the rotation display setting and the setting of still image orientation information recording to be made by using a single choice and enables what setting value is set by using each choice to be simply displayed, and a large display area is not used.

A cursor 614 represents the choice that is currently selected. The system control unit 50 moves the cursor 614 in response to operation of the up and down buttons. When the setting button is operated, the system control unit 50 stores the setting of still image orientation information recording corresponding to the choice that is currently selected and the rotation display setting in the non-volatile memory 56 and ends display of the setting screen for the still image vertical position information.

Figure 6C:
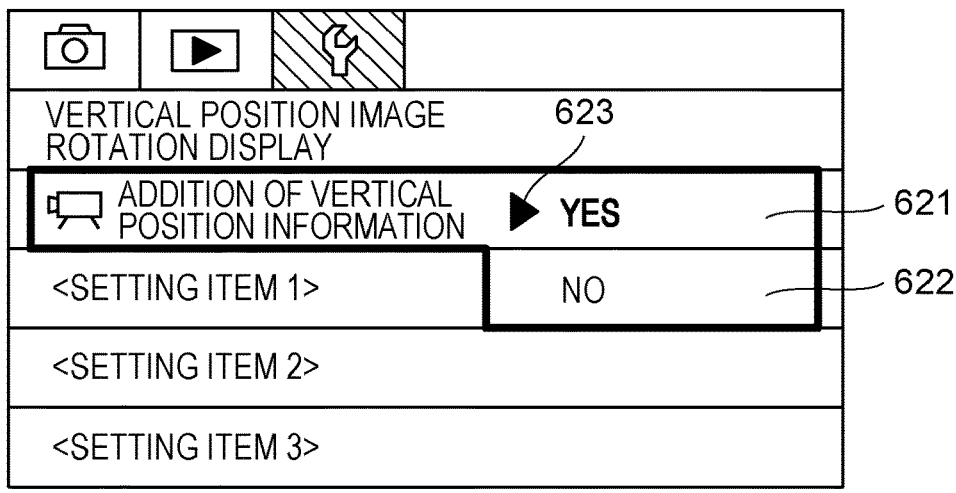

As illustrated in FIG. 6C, two choices are displayed as the choice group on the setting screen for the moving image vertical position information. The setting of moving image orientation information recording that represents whether the orientation information that is detected during capturing is recorded in the moving image is made on the setting screen for the moving image vertical position information. That is, the rotation display setting is not made on the setting screen for the moving image vertical position information. The setting that represents the orientation information that is detected during capturing is recorded in the moving image means the setting that represents the orientation of the camera during capturing is recorded, which corresponds to the setting that represents the vertical position information can be added. The setting that represents the orientation information that is detected during capturing is not recorded in the moving image means the setting that represents the orientation information that represents the horizontal position is recorded regardless of the orientation of the camera, which corresponds to the setting that represents the vertical position information is not added.

A first choice 621 is a choice for a setting that represents the orientation information of the camera 100 that is detected during capturing is recorded in the moving image, where a character string of "YES" that represents the orientation information is recorded is displayed.

A second choice 622 is a choice for the setting that represents the orientation information of the camera 100 that is detected during capturing is not recorded in the moving image, where a character string of "NO" that represents the orientation information is not recorded is displayed.

A cursor 623 represents the choice that is currently selected. The system control unit 50 moves the cursor 623 in response to operation of the up and down buttons. When the setting button is operated, the system control unit 50 stores the setting of moving image orientation information recording corresponding to the choice that is currently selected in the non-volatile memory 56 and ends display of the setting screen for the moving image vertical position information.

The modification to the setting screen for the still image vertical position information and the modification to the setting screen for the moving image vertical position information are described above with reference to FIG. 6A to FIG. 6C. According to the modifications, the setting items for the setting of still image orientation information recording and the setting items for the setting of moving image orientation information recording are displayed when the setting tab 603 of the menu screen related to the function of the camera is selected. However, the setting items may be displayed when the setting tab 601 related to capturing is selected. In the case where the setting items are displayed when the setting tab 601 related to capturing is selected, whether the setting items for setting of still image orientation information recording and the setting items for the setting of moving image orientation information recording are displayed may be switched depending on the capturing mode of the camera. For example, in the still image capturing mode, the setting items for the setting of still image orientation information recording may be displayed, and the setting items for the setting of moving image orientation information recording may not be displayed. In the moving image capturing mode, the setting items for the setting of moving image orientation information recording may be displayed, and the setting items for the setting of still image orientation information recording may not be displayed. If the moving image recording button 65 enables the moving image to be captured also in the still image capturing mode, in the still image capturing mode, the setting items for the setting of still image orientation information recording and the setting items for the setting of moving image orientation information recording are displayed. In the moving image capturing mode, the setting items for the setting of moving image orientation information recording may be displayed, and the setting items for the setting of still image orientation information recording may not be displayed.

Processes in the capturing mode of the camera 100 will now be described with reference to the flowchart in FIG. 4. The processes in the flowchart in FIG. 4 are performed in a manner in which the system control unit 50 reads a program that is recorded in the non-volatile memory 56, and on the basis of the program, components are controlled, and a calculation process is performed.

At S401, the system control unit 50 first obtains an output result of the orientation detector 55, that is, the orientation of the camera 100 that is detected by the orientation detector 55.

At S402, the system control unit 50 subsequently determines whether the user pushes the shutter button 61 for capturing a still image. If it is determined that the shutter button is pushed, the flow proceeds to S403. If the shutter button is not operated, the flow proceeds to S407.

At S403, the system control unit 50 performs the still image capturing process. In the still image capturing process, the A/D converter 23 converts a signal that the imaging unit 22 obtains by imaging into digital data (image data), the image-processing unit 24 performs still image processing and writes the image data in the memory 32. The system control unit 50 generates an image file such as a JPEG file from the image data that is written in the memory.

At S404, the system control unit 50 reads the setting value of the setting of still image orientation information recording that is stored in the non-volatile memory 56. The setting value is set on the setting screen by the user as described above. If the setting represents that the orientation information of the camera that is detected during capturing is recorded as the setting of still image orientation information recording, that is, the vertical position information can be added to the still image, the flow proceeds to S405. If the setting represents that the orientation information of the camera that is detected during capturing is not recorded, that is, the vertical position information is not added, the flow proceeds to S406.

At S405, the system control unit 50 adds, as the metadata of a still image file, orientation information that represents an angle (0 degrees, 90 degrees, 180 degrees, or 270 degrees) that is detected by the orientation detector 55 at S401. The still image file to which the orientation information is added is recorded in the recording medium 200. Since the orientation information that is added to the still image file at S405 is detected by the orientation detector 55 right before the still image is captured, the orientation information corresponds to the orientation of the camera 100 while the still image is captured. The orientation detector 55 may detect the orientation of the camera 100 right after an instruction for capturing the still image to record the orientation information. According to the present embodiment, information that represents 0 degrees, 90 degrees, 180 degrees, or 270 degrees is recorded as the orientation information. However, information about an angle ranging from 0 degrees to 360 degree that is detected by the orientation detector 55 may be recorded as the orientation information. At S405, the vertical position information that represents the camera 100 is in an orientation in which the camera rotates 90 degrees or 270 degrees can be added to the still image file for recording. The flow proceeds to S418.

At S406, since the setting represents that the orientation information that is detected during capturing is not recorded as the setting of still image orientation information recording, the system control unit 50 does not add the orientation information about the orientation that is detected at S401 to the metadata of the still image file. Information (horizontal position information) that represents 0 degrees is added to the still image file instead, regardless of the orientation that is detected at S401. The still image file is recorded in the recording medium 200. That is, the vertical position information that represents the orientation of the camera is the vertical position is not added to the still image file. Subsequently, the flow proceeds to S418.

At S407, the system control unit 50 determines whether the moving image recording button 65 is pushed, that is, whether the instruction for starting recording of the moving image is inputted. If the moving image recording button is pushed, the flow proceeds to S408. If the moving image recording button is not pushed, the flow proceeds to S418.

At S408, the system control unit 50 reads the setting value of the setting of moving image orientation information recording that is stored in the non-volatile memory 56 and determines whether the setting represents that the orientation information that is detected during capturing is recorded as the setting of moving image orientation information recording. If the setting represents that the orientation information that is detected during capturing is recorded, that is, the vertical position information can be added, the flow proceeds to S409. If the setting represents that the orientation information that is detected during capturing is not recorded, that is, the vertical position information is not added, the flow proceeds to S411.

At S409, the system control unit 50 determines whether the current capturing mode or record mode of the moving image corresponds to a mode in which the moving image is recorded as a moving image file that has chapter information. If it is determined that the moving image is recorded with the chapter information, the flow proceeds to S410. If it is determined that the moving image is recorded without the chapter information, the flow proceeds to S411.

At S410, the system control unit 50 sets the orientation information of the moving image that is to be captured and recorded to the orientation (an angle of 0 degrees, 90 degrees, 180 degrees, or 270 degrees) of the camera 100 that is detected by the orientation detector 55 at S401, and records the setting in the memory 32. Since the orientation of the camera is detected at S401 right before the moving image is captured, the orientation corresponds to the orientation of the camera 100 at the beginning of capturing of the moving image (at the beginning of recording of the moving image data). The orientation detector 55 may detect the orientation of the camera 100 right after the instruction for starting capturing of the moving image to set the orientation information.

At S411, the system control unit sets the orientation information of the moving image that is to be captured and recorded to the orientation information that represents the rotation angle is 0 degrees and records the setting in the memory 32. At S411, the orientation information (horizontal position information) that represents 0 degrees is set such that the orientation information depending on the detected orientation of the camera is not recorded, that is, the vertical position information is not recorded, regardless of the orientation of the camera 100 that is detected by the orientation detector 55 at S401.

The moving image with the chapter information is recorded to play back different moving images that are captured in response to multiple instructions for starting capturing and that have relevant information in moving image files. The moving image files are relevant to each other. The moving image data of each moving image file defines a series of chapters of each moving image. According to the present embodiment, examples of the moving image with the chapter information include a moving image that is captured in a snapshot moving image mode in which the moving image is captured for a short time of about 4 seconds and a moving image that is captured in a capturing mode in which the moving image is recorded for a short time at the same time as a still image is captured. These moving images are assumed to be continuously played back. Accordingly, if the orientation information of the moving image varies in each chapter, the aspect ratio of the screen varies during playback of the moving image. This makes the moving image difficult to watch. According to the present embodiment, the orientation information depending on the detected orientation of the camera is not recorded in the moving image file with the chapter information in order to prevent the moving image from being difficult to watch. That is, even when the orientation of the camera 100 is the vertical position while the moving image is captured, the orientation information that represents the vertical position is not added, but the orientation information that represents the horizontal position is added.

At S412, the system control unit 50 implements control such that the process of recording the moving image is performed. In the process of recording the moving image, imaging is repeated at the frame rate that is set by the imaging unit 22, and the A/D converter 23 converts the signal that is obtained by imaging into digital data to obtain serial images, that is, moving image data. The image-processing unit 24 performs moving image processing and a compression encoding process on the obtained moving image data and writes pieces of serial image data (moving image data) in the memory 32. The system control unit 50 generates a moving image file such as a MPEG file from the pieces of serial image data (moving image data) that are written in the memory 32 and records the moving image file in the recording medium 200 via the recording medium I/F 18 for recording control.

At S413, the system control unit determines whether the user operates the moving image recording button 65 again and inputs an instruction for ending recording of the moving image. If it is determined that the instruction for ending recording of the moving image is inputted, the flow proceeds to S414. If the instruction for ending recording of the moving image is not inputted, the flow proceeds to S415.

At S414, the system control unit stops the process of recording the moving image, ends recording of the moving image data that is written in the memory 32 in the recording medium 200, and records, in the recording medium 200, the moving image file of the moving image data that is obtained by capturing during a period from the instruction for starting recording of the moving image to the instruction for ending recording of the moving image. At S414, the orientation information that is set in the memory 32 is read, and the orientation information that is read from the memory 32 is recorded as the metadata of the moving image file. That is, the orientation information that is set at S410 or S411 or the orientation information that is set at S417 in the case where a file splitting process is performed is added to the metadata of the moving image file, and the moving image file is recorded in the recording medium 200. In the case where the orientation information is set at S410, the orientation information of the camera that is detected at the beginning of capturing of the moving image is added to the moving image file, and the vertical position information can be added. In the case where the orientation information is set at S411, the horizontal position information that represents 0 degrees, which means there is no rotation is recorded as the orientation information of the moving image file regardless of the orientation of the camera, and the vertical position information is not recorded. The orientation information that is set at S417 will be described later.

At S415, whether a file split condition is satisfied, and the file splitting process is performed during the process of recording the moving image is determined. In some cases, the upper limit of the size of a single file depends on restriction of file format. Accordingly, when a file size reaches the upper limit during recording of the moving image, the file splitting process is performed to continue recording of the remaining moving image data in a new moving image file. If the file splitting process is performed, the flow proceeds to S416. If the file splitting process is not performed, the flow returns to S412, and the process of recording the moving image continues.

At S416, the system control unit 50 performs the file splitting process, records the moving image data that has been recorded in the memory 32 as the moving image file, and closes the moving image file. At this time, the system control unit 50 reads the orientation information that is set in the memory 32 and records the orientation information that is read from the memory 32 as the metadata of the moving image file as in S414. That is, the orientation information that is set at S410 or S411 is recorded as the metadata of the moving image file, or in the case where the file splitting process has already been performed, the orientation information that is set at S417 is recorded. In the file splitting process, the orientation information is recorded in the moving image file (that is, the moving image file that contains the moving image data at the beginning of capturing) before the file is split as in a typical case where the file is not split.

At S417, the system control unit 50 generates a new moving image file in the file splitting process. Thereafter, in the process of recording the moving image at S412, the moving image data is recorded in the new moving image file that is generated after splitting. A setting is made such that the same orientation information as in the moving image file before splitting is recorded in the moving image file after splitting. The orientation information that is set in the memory 32 is recorded in the moving image file before splitting. Accordingly, the orientation information that is set in the memory 32 is not changed, and the same orientation information is recorded also at the end of recording of a next moving image file. The flow proceeds to S412 at which the process of recording the moving image in the new moving image file that is generated after splitting is performed.

In the case where the moving image file is recorded, a method of recording the orientation information is changed in accordance with the setting of moving image orientation information recording, whether the moving image with the chapter information is recorded, or whether the file splitting process is performed.

In the case where the setting of moving image orientation information recording represents that the orientation information that is detected by the camera is recorded, the orientation information that is detected while the moving image is captured is recorded in the moving image file. In the case of the moving image file that has the chapter information, however, the purpose is to continuously play back the moving image files. Accordingly, specific orientation information that represents the camera is not rotated (information that represents 0 degrees according to the present embodiment) is recorded instead of the detected orientation information. The orientation information of the camera that is detected at the beginning of capturing of the moving image data that is recorded in the moving image file is typically recorded. However, in the case where the file splitting process is performed to generate the new moving image file as the moving image file after splitting, and the remaining moving image data is recorded, the same orientation information as the orientation information that is recorded in the moving image file before splitting is recorded in the moving image file after splitting. That is, the same orientation information as in the first file is recorded in the second or later moving image files that are generated in the file splitting process. The reason is to prevent the aspect ratio of the screen from varying during playback of the moving image when the split moving image files are continuously played back.

At S418, the system control unit 50 determines whether one of the operation units 70 is operated to end the capturing mode. If the operation of the end of the capturing mode is made, the system control unit 50 ends this process. If there is an operation to end the capturing mode, the flow returns to S401, and the processes are repeated.

The processes in the capturing mode are described above.

The image display process in a playback mode in the camera 100 will now be described with reference to FIG. 7.

FIG. 7 is a flowchart illustrating the image display process in the playback mode. The processes in the flowchart are performed in a manner in which the system control unit 50 reads a program that is recorded in the non-volatile memory 56, and on the basis of the program, components are controlled, and a calculation process is performed.

At S701, the system control unit 50 first reads an image file to be displayed from the recording medium 200. The image file that is to be displayed is sequentially read in order from the latest image file.

At S702, the system control unit 50 subsequently determines whether the image file that is read at S701 and that is to be displayed is a still image file or a moving image file. The system control unit 50 determines whether the image file to be displayed is a still image file or a moving image file from the extension or metadata of the image file. If the image file is a still image file, the flow proceeds to S703. If the image file is not a still image file but a moving image file, the flow proceeds to S706.

At S703, the system control unit 50 reads the setting value of the rotation display that represents the image is rotated and displayed during playback from the non-volatile memory 56. If the setting represents that the rotation display is allowed, the flow proceeds to S704. If the setting represents that the rotation display is not allowed, the flow proceeds to S706.

At S704, the system control unit 50 subsequently reads the orientation information (vertical position information) from the metadata of the still image file that is read at S701 and that is to be displayed and determines whether the read orientation information is 0 degrees. If the orientation information is not 0 degrees, the flow proceeds to S705. If the orientation information is 0 degrees, or the orientation information is not recorded, the flow proceeds to S706.

At S705, the system control unit rotates the image data of the image file that is read at S701 depending on the angle that is recorded in the orientation information of the metadata of the image file and causes the liquid crystal display 27 to display. The image is rotated and displayed such that the entire rotated image is within the display screen. That is, the image is displayed with blank areas added on the left and right sides of the image. The blank areas may be displayed in black color, may be displayed in white color, or may be displayed in a color depending on the image. The flow proceeds to S707.

At S706, the system control unit 50 causes the liquid crystal display 27 to display the image data of the image file that is read at S701 without rotation. The flow proceeds to S707.

At S707, the system control unit 50 determines whether the user operates the left and right buttons and inputs an instruction for moving to a next image (previous image). If the instruction for moving to the next image (previous image) is inputted, the system control unit 50 returns the flow to S701 to perform the display process on a next image file. If the instruction for moving to the next image is inputted, the processes after S701 are performed on the next image file. If the instruction for moving to the previous image is inputted, the processes after S701 are performed on a previous image file.

At S708, the system control unit 50 determines whether the user inputs an instruction for ending the image display process including an instruction for ending the playback mode and instructions for other processes. If the instruction for ending the image display process is not inputted, the system control unit 50 returns the flow to S707. If the instruction for ending the image display process is inputted, this process ends.

In the case where the image file is a moving image file, the camera 100 according to the present embodiment displays the moving image data without rotation regardless of the setting of the rotation display of the image that is made on the setting screen and the orientation information of the image file. In the case where the image file is a still image file, the image data is rotated and displayed in accordance with the setting of the rotation display (rotation and playback) of the image on the setting screen, and the orientation information of the image file.

The camera 100 according to the present embodiment displays moving image data without rotation. A rotated image is displayed with a decreased size, and the processing load of the rotation process increases. A moving image may be seen with the direction of the camera 100 changed, because the vertical and horizontal positions of the image do not change during playback of the single moving image. In the case where still images are sequentially played back, however, the orientation information differs between the still images. It takes time and effort to change the direction of the camera 100 depending on the vertical and horizontal orientations of the images whenever the images are seen. For this reason, depending on the setting of the rotation display, the camera 100 according to the present embodiment enables the images to be rotated and displayed in accordance with the orientation information, and this makes it easy to see the images even when the still images are sequentially played back.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068848 filed Mar. 29, 2019 and Japanese Patent Application No. 2019-068849 filed Mar. 29, 2019, which are hereby incorporated by reference herein in their entirety.

What is claimed is:

1. An imaging apparatus comprising:
an imaging unit;
at least one processor; and
at least one memory storing instructions, when executed by the at least one processor, cause the imaging apparatus to function as:
a detection unit that detects orientation of the imaging apparatus;
a control unit that implements control such that a still image or a moving image captured by the imaging unit is recorded in a recording medium;
a first setting unit that sets whether orientation information based on the orientation detected by the detection unit is recorded together with the still image captured by the imaging unit;
a second setting unit that sets whether the orientation information based on the orientation detected by the detection unit is recorded together with the moving image captured by the imaging unit; and
a playback unit that plays back the image recorded in the recording medium,
wherein the playback unit rotates and plays back the still image based on the orientation information recorded together with the still image in accordance with a setting that represents whether the image is rotated and displayed based on the orientation information recorded together with the image when the still image is played back, and plays back the moving image without rotation of the moving image when the moving image is played back.

2. The imaging apparatus according to claim 1,
wherein the control unit controls, based on a setting of the first setting unit, whether orientation information that represents the orientation detected by the detection unit is recorded together with the still image when the still image is recorded and controls, based on a setting of the second setting unit, whether the orientation information that represents the orientation detected by the detection unit is recorded together with the moving image when the moving image is recorded.

3. The imaging apparatus according to claim 2,
wherein the control unit implements control such that orientation information that represents predetermined orientation in which the imaging apparatus is not rotated is recorded together with the still image or the moving image captured, when the corresponding setting represents that orientation information in which the orientation information based on the orientation detected by the detection unit is recorded is not recorded.

4. The imaging apparatus according to claim 1,
wherein the first setting unit sets whether the orientation information is recorded together with the still image captured by the imaging unit and sets whether the image is rotated and played back based on the orientation information recorded together with the image.

5. The imaging apparatus according to claim 4, wherein the at least one memory storing instructions, when executed by the at least one processor, cause the imaging apparatus to further function as:
a display control unit that implements control such that a setting screen is displayed,
wherein the display control unit implements control such that a first choice group is displayed on the setting screen, the first choice group being used for a setting that represents whether the orientation information based on the orientation detected by the detection unit is recorded together with the still image and including
a first choice for a setting that represents the image is rotated and played back based on the orientation information and that orientation information in which the orientation information based on the orientation detected by the detection unit is recorded is recorded together with the still image,
a second choice for a setting that represents the image is played back without rotation of the image based on the orientation information and that the orientation information in which the orientation information based on the orientation detected by the detection unit is recorded is recorded together with the still image, and
a third choice for a setting that represents the image is played back without rotation of the image based on the orientation information and that the orientation information in which the orientation information based on the orientation detected by the detection unit is recorded is not recorded together with the still image, and
wherein the first setting unit sets whether the orientation information in which the orientation information based on the orientation detected by the detection unit is recorded is recorded together with the still image depending on a choice selected from the first choice group, and sets whether the image is rotated and played back based on the orientation information.

6. The imaging apparatus according to claim 5,
wherein the display control unit implements control such that for the first choice, a first character string that represents the image is rotated and played back based on the orientation information, a first icon that represents an imaging apparatus, and a second icon that represents a playback device other than an imaging apparatus are displayed, for the second choice, the first icon is not displayed, and the first character string and the second icon are displayed, and for the third choice, a third character string that represents the image is played back without rotation of the image based on the orientation information is displayed.

7. The imaging apparatus according to claim 5,
wherein the display control unit implements control such that a second choice group is displayed on the setting screen, the second choice group being used for a setting that represents whether the orientation information in which the orientation information based on the orientation detected by the detection unit is recorded is recorded together with the moving image and including
a fourth choice for a setting that represents the orientation information in which the orientation information based on the orientation detected by the detection unit is recorded is recorded together with the moving image, and
a fifth choice for a setting that represents the orientation information in which the orientation information based on the orientation detected by the detection unit is recorded is not recorded together with the moving image, and
wherein the second setting unit sets whether the orientation information in which the orientation information based on the orientation detected by the detection unit is recorded is recorded together with the moving image depending on a choice selected from the second choice group.

8. The imaging apparatus according to claim 5,
wherein the display control unit enables setting items including at least a first setting item set by the first setting unit and a second setting item set by the second setting unit to be displayed on the setting screen, and
wherein the first setting item is displayed by a character string, and the second setting item is displayed by a character string and an icon related to the moving image.

9. The imaging apparatus according to claim 1,
wherein the control unit implements control such that the orientation information based on the orientation detected by the detection unit is recorded at a beginning of capturing of the moving image in a case where the orientation information based on the orientation detected by the detection unit is recorded together with the moving image.

10. The imaging apparatus according to claim 1, wherein the at least one memory storing instructions, when executed by the at least one processor, cause the imaging apparatus to further function as:
a display control unit that implements control such that a first setting item set by the first setting unit and a second setting item set by the second setting unit are displayed on a display unit,
wherein the display control unit implements control such that the second setting item is not displayed depending on an operation mode of the imaging apparatus.

11. An image control method comprising:
implementing control such that a still image or a moving image captured by an imaging apparatus is recorded in a recording medium;
setting whether orientation information that represents orientation of the imaging apparatus when the still image is captured is recorded together with the still image captured by the imaging apparatus; and
setting whether the orientation information that represents the orientation of the imaging apparatus when the moving image is captured is recorded together with the moving image captured by the imaging apparatus; and playing back the image recorded in the recording medium,
wherein, the still image is rotated and played back based on the orientation information recorded together with the still image in accordance with a setting that represents whether the image is rotated and displayed based on the orientation information recorded together with the image when the still image is played back, and the moving image is played back without rotation of the moving image when the moving image is played back.

12. The image control method according to claim 11,
wherein based on a setting, controlling whether the orientation information that represents the orientation of the imaging apparatus when the still image is captured is recorded together with the still image when the still image is recorded and includes controlling, based on a setting, whether the orientation information that represents the orientation of the imaging apparatus when the moving image is captured is recorded together with the moving image when the moving image is recorded.

13. A non-transitory computer-readable storage medium storing a program for causing a computer to execute the control method according to claim 11.

14. An imaging apparatus comprising:
an imaging unit;
at least one processor; and
at least one memory storing instructions, when executed by the at least one processor, cause the imaging apparatus to function as:
a detection unit that detects orientation of the imaging apparatus;
a control unit that implements control such that a still image or a moving image captured by the imaging unit is recorded in a recording medium;
a first setting unit that sets whether orientation information based on the orientation detected by the detection unit is recorded together with the still image captured by the imaging unit; and
a second setting unit that sets whether the orientation information based on the orientation detected by the detection unit is recorded together with the moving image captured by the imaging unit,
wherein the control unit implements control such that the orientation information based on the orientation detected by the detection unit is not recorded together with the moving image regardless of a setting of the second setting unit in a case where the moving image corresponds to a moving image with chapter information, or moving images that are captured in response to multiple capturing instructions and that are recorded as a single moving image.

15. An image control method comprising:
implementing control such that a still image or a moving image captured by an imaging apparatus is recorded in a recording medium;
detecting orientation of the imaging apparatus;
setting whether orientation information that represents orientation of the imaging apparatus when the still image is captured is recorded together with the still image captured by the imaging apparatus; and
setting whether the orientation information that represents the orientation of the imaging apparatus when the moving image is captured is recorded together with the moving image captured by the imaging apparatus,
wherein, in a case where the moving image is a moving image having chapter information or a moving image prepared by recording as a single moving image multiple moving images captured in accordance with multiple capturing instructions given more than once, the control is implemented such that orientation information based on the orientation detected is not recorded together with the moving image irrespective of the setting made.

16. A non-transitory computer-readable storage medium storing a program for causing a computer to execute the image control method according to claim 15.

17. An imaging apparatus comprising:
   an imaging unit;
   at least one processor; and
   at least one memory storing instructions, when executed by the at least one processor, cause the imaging apparatus to function as:
   a detection unit that detects orientation of the imaging apparatus;
   a control unit that implements control such that a still image or a moving image captured by the imaging unit is recorded in a recording medium;
   a first setting unit that sets whether orientation information based on the orientation detected by the detection unit is recorded together with the still image captured by the imaging unit;
   a second setting unit that sets whether the orientation information based on the orientation detected by the detection unit is recorded together with the moving image captured by the imaging unit; and
   a record control unit for control such that the moving image being recorded is split into multiple files and recorded when a predetermined condition is satisfied while the moving image is recorded,
   wherein the control unit implements control whether the orientation information based on the orientation detected by the detection unit is recorded in accordance with a setting of the second setting unit at a beginning of capturing of the moving image, and implements control such that the orientation information based on the orientation detected by the detection unit is not recorded together with the moving image regardless of the setting of the second setting unit in a case where the moving image is recorded in a new moving image file to split the moving image into multiple moving image files for recording because of satisfaction of the predetermined condition.

18. An image control method comprising:
   implementing control such that a still image or a moving image captured by an imaging apparatus is recorded in a recording medium;
   detecting orientation of the imaging apparatus;
   setting whether orientation information that represents orientation of the imaging apparatus when the still image is captured is recorded together with the still image captured by the imaging apparatus; and
   setting whether the orientation information that represents the orientation of the imaging apparatus when the moving image is captured is recorded together with the moving image captured by the imaging apparatus,
   wherein, the control is implemented such that, in a case where a predetermined condition is satisfied during recording of the moving image, the moving image that is being recorded is split into a plurality of files, and
   wherein, whether to record orientation information based on the orientation detected is recorded or not is controlled in accordance with the setting made when the recording of the moving image starts, and, in a case where the moving image is recorded into a new moving image file for split recording into the plurality of files in accordance with satisfaction of the predetermined condition, the control is implemented such that the orientation information based on the orientation detected is not recorded together with the moving image irrespective of the setting made.

19. A non-transitory computer-readable storage medium storing a program for causing a computer to execute the control method according to claim 18.

* * * * *